T. H. DUNCOMBE.
ROTARY EXPLOSIVE ENGINE.
APPLICATION FILED DEC. 7, 1918.

1,367,591.

Patented Feb. 8, 1921.
5 SHEETS—SHEET 5.

Witness
Chas. W. Stauffiger
Karl H. Butler

Inventor
Tyrrell H. Duncombe,
By
Attorneys

UNITED STATES PATENT OFFICE.

TYRRELL H. DUNCOMBE, OF ROMEO, MICHIGAN.

ROTARY EXPLOSIVE-ENGINE.

1,367,591. Specification of Letters Patent. Patented Feb. 8, 1921.

Application filed December 7, 1918. Serial No. 265,737.

*To all whom it may concern:*

Be it known that I, TYRRELL H. DUNCOMBE, a citizen of the United States of America, residing at Romeo, in the county of Macomb and State of Michigan, have invented certain new and useful Improvements in Rotary Explosive-Engines, of which the following is a specification, reference being had therein to the accompanying drawings.

This invention relates to internal combustion engines and more particularly to this class of engines of a rotary type in which the members impelled by the impact of explosion are given a rotation as distinguished from a reciprocating motion.

An object of the invention is to provide a construction in which the sequence of operations is the same as in the four cycle reciprocating piston engine, to-wit, explosion or power travel, expulsion of the burned gases, intake of a new charge, and compression of the charge. A further object is to provide a construction wherein this cycle of operation is completed during each revolution of the power member or member impelled by the exploding charge and wherein the shaft which is driven by such power members receives at least two impulses during each revolution thereof. A further object is to provide means whereby power is transmitted to such shaft in such a manner that said shaft may turn in one direction independently of said means, and to provide an engine which is simple and compact in construction, and cheap to manufacture.

With the above and other ends in view, the invention consists in the matters hereinafter set forth and more particularly pointed out in the appended claims, reference being had to the accompanying drawings, in which—

While in the drawings, an embodiment of the invention has been shown, it will be understood that the same is merely illustrative of the invention and that the construction, arrangement and combination of parts may be modified within the scope of the appended claims, without departing from the spirit of the invention.

As shown in the drawings, a cylindrical casing 1 is suitably supported in a horizontal position, and the ends of this cylindrical casing are enlarged to provide what may be considered as power transmitting chambers 2 and 3, said chambers having the outer ends thereof closed by end plates 4, which are suitably secured to the enlarged ends of the casing 1 by screw bolts 5 or other fastening means. The end plates 4 have concentric bearings 6 and journaled in said bearings is a longitudinal shaft 7 which is in the axis of the cylindrical casing 1. On one end of the shaft 7 is a balance or fly wheel 8, and on the opposite end thereof is a power transmitting wheel, for instance, a belt pulley 9.

Figure 4:
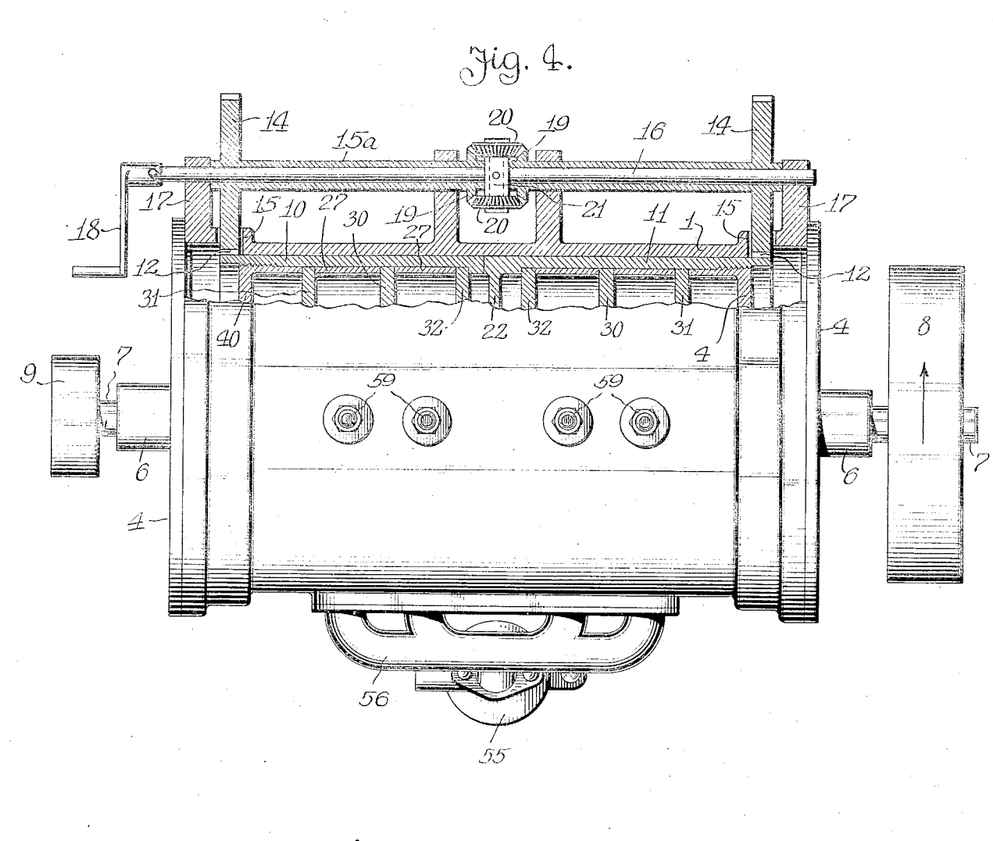
Fig. 4 is a plan view in elevation of Fig. 1 drawn to a reduced scale and with portions in section.
Figures 5, 6, 9:
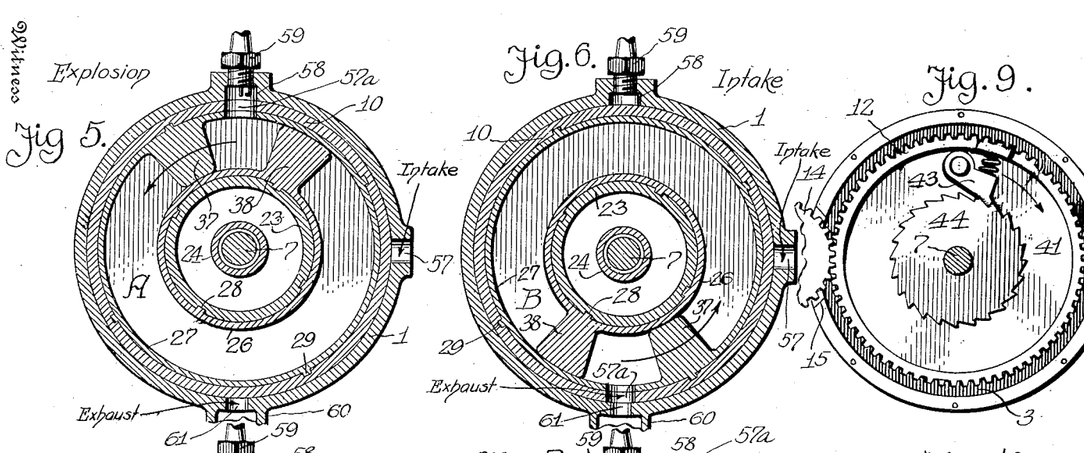
Figs. 5, 6, 7 and 8 are transverse vertical sections through the combustion chambers illustrating the successive positions of the abutments and parts during the cycle of operation.
Figs. 9 and 10 are end elevations of the left and right hand ends respectively, of the engine with end plates removed.
Figures 7, 8, 10:
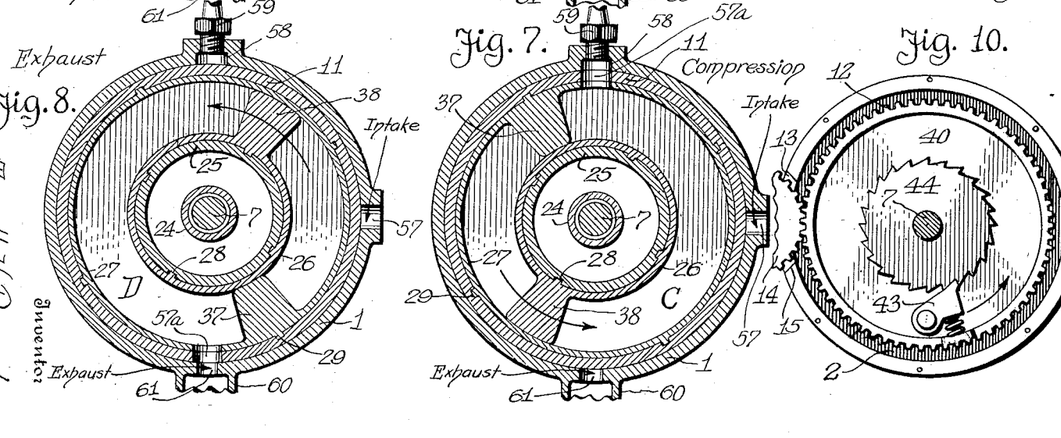
Figure 11:
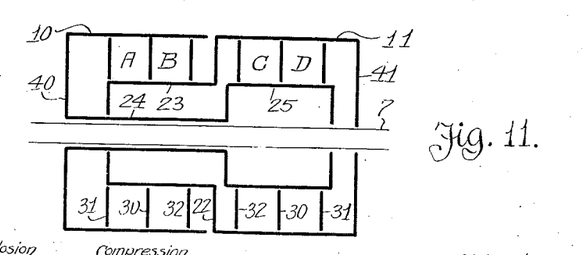
Fig. 11 is a diagrammatic view illustrating an arrangement of rotors and their combustion chambers.
Figure 12:
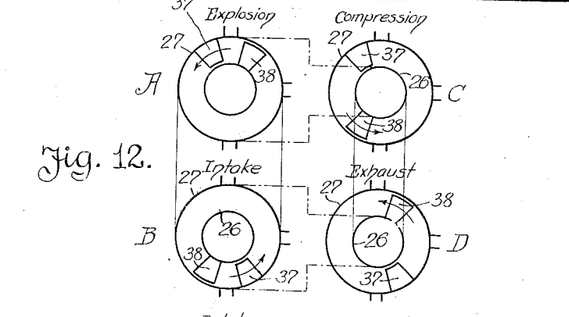
Figs. 12, 13, 14 and 15 are diagrams illustrating the operation of the engine.
Figure 13:
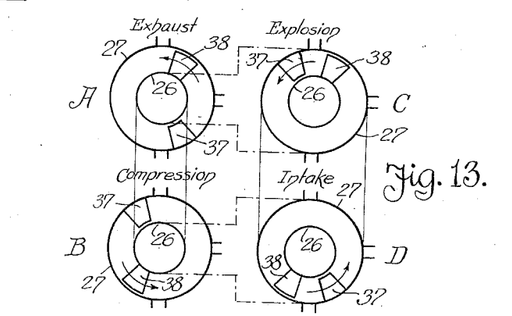
Figure 14:
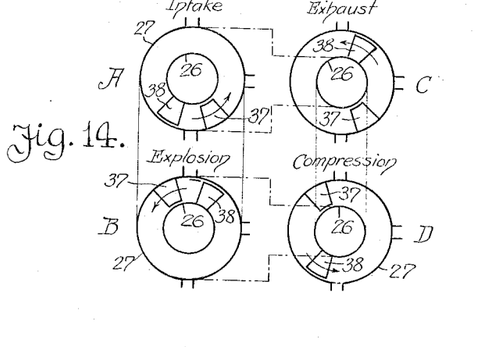
Figure 15:
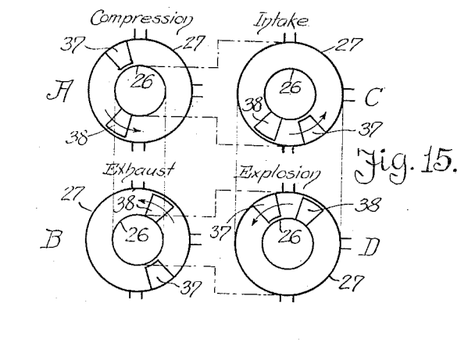

Rotatable in the cylindrical casing 1 are abutting and independent cylindrical rotors generally designated 10 and 11, said rotors being approximately the same length with the outer ends thereof extending into the chambers 2 and 3 and provided with peripheral teeth 12 which provide large gear wheels forming part of a starting mechanism or constituting means whereby power may be applied to the rotors 10 and 11 for starting the engine. As an instance of such starting mechanism, reference will be had to Figs. 4, 9 and 10, showing that the enlarged ends of the casing 1, or the walls of the chambers 3 have openings 15 permitting of gear wheels 14, extending into the chambers 3 and meshing with the teeth 12 on the ends of the rotors 10 and 11. The wheels 14 have elongated hubs 15ᵃ loose on a starter shaft 16 journaled in brackets 17 carried by the enlarged ends of the cylindrical casing 1. One end of the starter shaft 16 has a conventional form of crank 18 or similar device so that the starter shaft may be rotated and the confronting ends of the elongated hubs 15 terminate in confronting beveled gear wheels 19 meshing with similar gear wheels 20 rotatably supported on a transverse bearing 21, carried by the starter shaft 16, between the inner ends of the hubs 15ª. The manner in which this starter mechanism operates to impart movement to either the rotor 10 or the rotor 11 will be brought out when considering the general operation of the engine.

The inner or abutting end of the rotor 11 has an end wall 22 provided with a cylindrical hollow hub portion 23 concentric of the rotor 10 and of less length than said rotor, said hub portion having its outer end rotatable on the end of a sleeve 24 loose on the shaft 7. The sleeve 24 forms part of a hub portion 25 concentric of the rotor 11 and in many respects is similar to the hub portion 23 of the rotor 10. The hub portions 23 and 25 serve the rotors 10 and 11 respectively in forming annular chambers for inner and outer cylinder liners 26 and 27, the inner liners 26 being keyed or fixed, as at 28 to the hub portions 23 and 25 and the outer liners 27 being keyed or fixed, as at 29, to the rotors 10 and 11. All of the inner liners 26 are identical in construction within the rotors 10 and 11, also the outer liners 27, and there are sets of liners for each rotor, with said sets separated by an intermediate partition 30. Associated with the intermediate partitions 30 are end partitions 31 and 32 abutting the liners 26 and 27. By reference to Fig. 1, it will be observed that the end partitions 32 are seated in the inner ends of the rotors 10 and 11 with the partition 32 of the rotor 10 abutting an annular shoulder 33 on the hub portion 23, while the end partition 32 of the rotor 11 abuts an annular shoulder 34 on the hub portion 25 within the rotor 11. The liners and partitions can therefore be assembled from the outer ends of the hub portions 23 and 25. To maintain these elements assembled on the hub portions 23 and 25, said hub portions have the outer ends thereof provided with rings or large nuts 35 and 36 which may be screwed on the ends of the hub portions 25 and 23 respectively, and suitably locked thereon.

The arrangement of the hub portions 23 and 25, liners 26 and 27 and partitions 31 and 32, in the rotors 10 and 11, is such as to provide what may be considered as cylinders or chambers and for the convenience of considering these cylinders in the descriptive matter to hereinafter follow, said cylinders have been designated A, B, C, and D. The cylinders A and B are associated with the rotor 10 and the cylinders C, and D with the rotor 11, and in each cylinder is a power abutment 37 and a follower abutment 38. The power abutments 37 are carried by the outer liners 27 and since these liners are fixed relative to the rotors 10, and 11 it is obvious that said power abutments are movable with the rotors 10 and 11. The follower abutments 38 are carried by the inner liners 26 and these inner liners are fixed on the hub portions 23 and 26 and it is apparent that the follower abutments are moved simultaneously with the hub portions 23 and 25. The abutments 37 and 38 are radially disposed, as best shown in Figs. 5 to 8 inclusive and said abutments have a coöperative relation automatically maintained for a sequence of operations, similar to a four cycle reciprocating engine.

Screwed or otherwise mounted in the outer ends of the rotors 10 and 11, for instance at such places indicated by the reference numeral 39 are apertured heads 40 and 41, the head 40 having a hub 42 keyed or otherwise seated on the end of the sleeve 24, thereby establishing a driving relation between the rotor 10 and the hub portion 25 within the rotor 11.

The head 41 is loose on the shaft 7, and the outer faces of both of said heads support spring pressed pivoted pawls 43 normally engaging ratchet wheels 44 keyed or otherwise fixed on the shaft 7, the pawls 43 and the ratchet wheels 44 constituting a ratchet mechanism for each of the heads 40 and 41, with the ratchet mechanism of one head the same as the other head, as best shown in Figs. 9 and 10, so that said ratchet mechanism may be alternately brought into action for imparting a continuous rotary movement to the shaft 7.

The heads 40 and 41 coöperate with openings in the rotors 10 and 11 in providing pockets 45 for detents 46, and 47, said detents having conical heads adapted to engage in recesses or sockets 48 in the cylindrical casing 1, to momentarily hold the rotors 10 and 11 stationary in said cylindrical casing.

Figure 2:
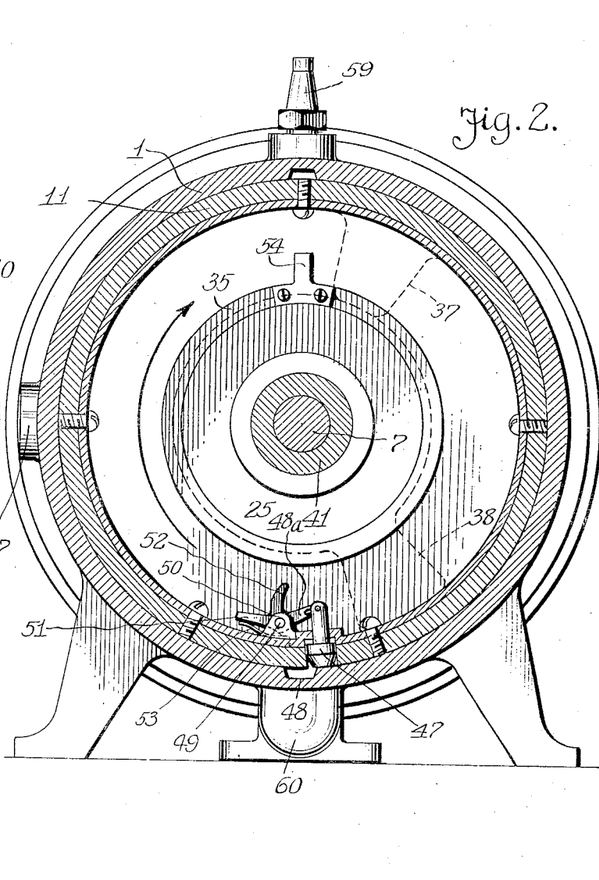
Fig. 2 is a transverse vertical section on the line II—II of Fig. 1.
Figure 3:
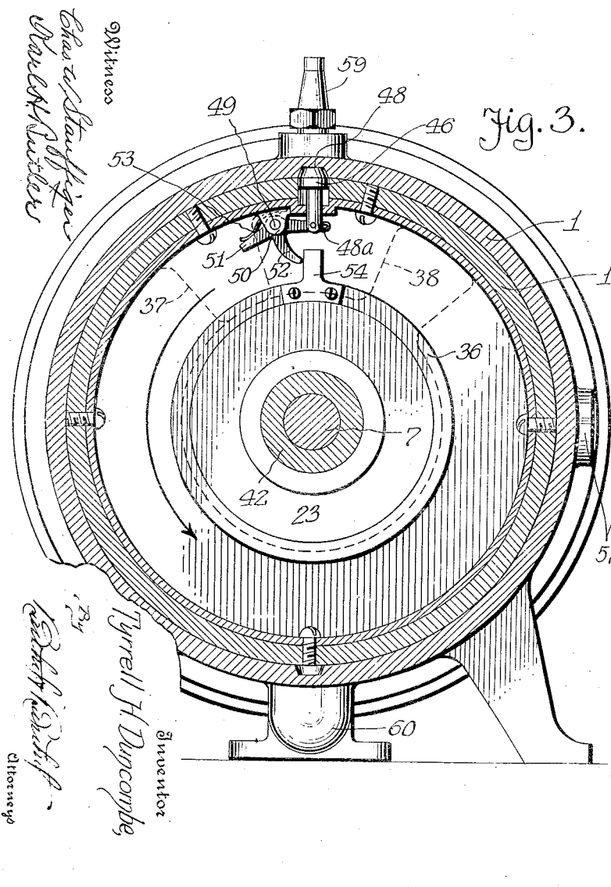
Fig. 3, a transverse vertical section on the line III—III of Fig. 1.

The inner ends of the detents 46 and 47 are loosely connected to slotted cranks 48ª of rock shafts 49, said rock shafts being journaled in apertured ears or bearings 50 carried by the heads 40 and 41, as clearly shown in Figs. 2 and 3. The rock shafts 49 have other crank portions 51 and 52, the former being engaged by the springs 53 which hold the detents for immediate engagement with the cylindrical casing 1, when the recesses 48 are encountered, said recesses being diametrically opposed as shown in Figs. 2 and 3.

The cranks 52 are in the path of travel of fingers or trips 54 carried by the rings or nuts 35 and 36, and the said detents and the tripping elements associated therewith constitute means for momentarily holding the rotors relative to the cylindrical casing 1, so that the power abutments will be held while the follower abutments assume new positions or perform certain duties in the cylinders of the engine.

At that side of the engine opposite the starting device or mechanism is a conventional form of carbureter 55 adapted to supply fuel to the cylinders of the engine through an intake manifold 56 which is connected to the side of the cylindrical casing 1 and communicates with ports 57 in said casing. These ports in turn will communicate with ports 57$^a$ in the rotors 10 and 11 and the outer liners thereof, so that an explosive mixture may be admitted to the cylinders of the engine between the power and follower abutments.

The top of the cylindrical casing 1 has sockets 58 corresponding in number to the cylinders of the engine, and these sockets support spark plugs 59 adapted to form part of a conventional form of ignition system for the internal combustion engines. The spark plugs 59 are adapted for igniting the explosive mixtures within the cylinders of the engine when the intake ports 57$^a$ of the rotors register with the sockets 58.

Below the cylindrical casing 1 is an exhaust manifold 60 having exhaust ports 61, and the ports 57$^a$ of the cylinders A, B, C and D are adapted to register with the ports 61 and permit of the burnt gases being expelled from the cylinders of the engine.

Figure 1:
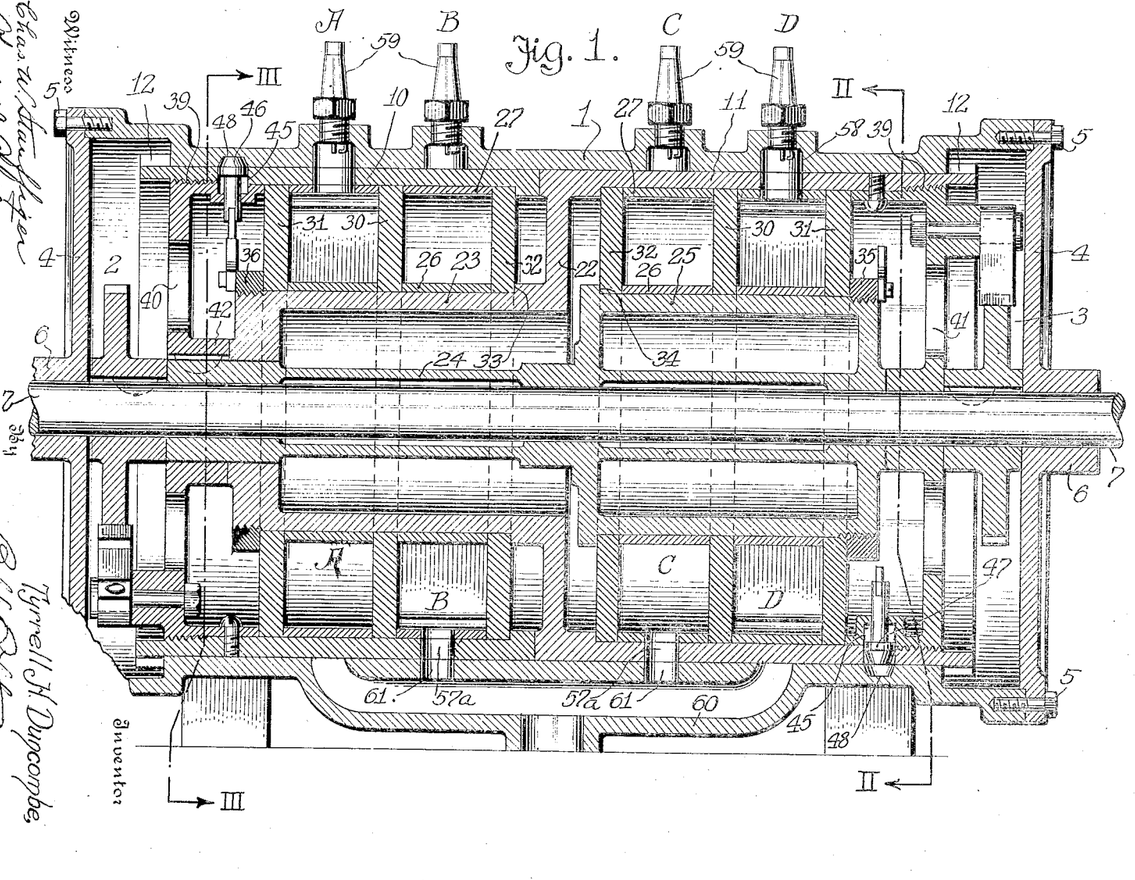
Figure 1 is a longitudinal vertical section through an engine illustrative of the invention.

Before describing the operation of the engine, it is necessary to refer to Fig. 1 in conjunction with Figs. 5 to 8 inclusive, to note the relative location of the power and follower abutments. In considering Figs. 5 to 8, it is well to remember that the cylinder A has been represented in Fig. 5 with the abutments in position maintaining a charge under compression and ready for ignition. The position of the abutments in cylinders B, C and D at this moment has been shown in Figs. 6, 7 and 8, and it will be noted that while the power abutments in the cylinders A and B of the rotor 10 move in unison, yet these power abutments are diametrically opposed or one hundred and eighty degrees apart, as shown in Figs. 5 and 6. This is also true of the abutments in the cylinders C and D of the rotor 11, and by reference to Fig. 1, it is obvious that the opposed power abutments move in synchronism with the follower abutments of cylinders C and D, and that the power abutments of cylinders C and D move in synchronism with the follower abutments of cylinders A and B. It is therefore obvious that when the rotor 10 is momentarily held against rotation by the detent 46, the power abutments of cylinders A and B and the follower abutments of cylinders C and D are held during the movement of the abutments controlled by the rotor 11 by the detent 47. This arrangement is a characteristic of my invention as I am able to compactly assemble the cylinders of the engine and eliminate a great deal of mechanism that would be otherwise required to correctly position the various abutments so that the engine would operate on the principle of a four cycle engine. Furthermore, it is apparent that the rotors containing the cylinders serve functionally as sleeve valves, and this alone eliminates structures and packing and mechanism incident to a timid coöperation of such structures.

Considering the operation of the engine, particularly in connection with Figs. 11 to 15 inclusive, it must be remembered that Figs. 5, 6, 7 and 8 show the position of abutments in all of the cylinders when the cylinder A is about to have its explosive mixture ignited, and furthermore, that the engine is constructed to operate on the same principle as a four cycle reciprocating piston engine, that is, while cylinder A is having the explosive mixture detonated to produce power travel of the unlocked abutment therein, that cylinder C is compressing a new charge therein and is next in order for firing. In cylinder B, which follows cylinder C in the order of firing, said cylinder B is receiving a new explosive charge and in cylinder D the exhaust or burnt gases are being expelled.

A cessation in the operation of the engine leaves one of the rotors 10 or 11 unlocked, that is, its detent is in a retracted position, so that the rotor may be revolved. The other rotor is locked against rotation by its detent and this condition may be reversed, but at no one period are both rotors locked against starting. To place the engine in operation, the starting mechanism or device may be operated by hand or power, and when the starter shaft 16 is revolved, the gear wheel 14 associated with the locked rotor will be held stationary and consequently the beveled gear wheel 19 carried by the elongated hub 15$^a$ of the locked gear wheel 14. The unlocked gear wheel 14 will therefore have movement imparted to it through the medium of the beveled gear wheels 20 and the starter shaft 16, and the unlocked rotor can be rotated through one half of a revolution to cause the engine to start under its own power.

Assuming that at the moment of the engine operating under its own power that the various cylinders of the engine are in the conditions illustrated in Figs. 5 to 8 inclusive, then the ignition of the explosive charge between the power and follower abutments 37 and 38 causes the power abutment 37 within the cylinder A to be driven in a counter clockwise direction, as indicated by arrows in Fig. 5. As the power abutment 37 is movable with the unlocked rotor 10, it can be driven circumferentially of the cylinder A, while the follower abutment 38 is held stationary by the locked rotor 11. As the power abutment 37 in cylinder A is propelled and movement imparted to the rotor 10, the intake and exhaust ports 57 and 61 are necessarily closed for cylinder A, and as the power abutment 37 in the cylinder B is part of the rotor 10, said power abutment will be moved simultaneously with the power abutment in cylinder A and traveling in a counter clockwise direction will force an explosive charge ahead of it so as to trap the explosive charge between the abutments within the cylinder B, the power abutment 38 therein having remained stationary, similar to the follower abutment in cylinder A by reason of both of these abutments being held by the locked rotor 11. In referring to the abutment 38 in cylinder B, as a power abutment, even though it is locked through the medium of the rotor 11, it is now apparent that the abutments 37 and 38 alternately or at times serve either as a power abutment or a follower abutment.

While these operations have been taking place in cylinders A and B, cylinder D has had burnt gases expelled through the exhaust ports thereof by the abutment 37 in said cylinder, and in cylinder C the abutment 38 compresses an explosive charge against the power abutment 37 adjacent a spark plug, thus placing the cylinder C next in firing order to cylinder A.

When the rotor 10 is driven by the explosion within the cylinder A, said rotor has movement imparted thereto for a half revolution and through the medium of the ratchet mechanism associated with the head 40 of the rotor 10, the shaft 7 is rotated a half revolution; the pawl of the ratchet mechanism associated with the head 41 receding over the ratchet wheel 44 as the shaft 7 is operated from the opposite end of the engine. During the movement of the rotor 10 the retracted detent thereof is eventually caused to impinge against the finger or trip 54 on the hub portion 23 of the rotor 11, consequently as the driven rotor completes its half revolution the detent thereof snaps into engagement with the cylindrical casing 1, thereby locking the rotor 10 against further movement. Of course, during the operation of the engine this locking of the rotor is momentary, however, it is sufficient to allow the rotor 10 to remain stationary while the rotor 11, containing the cylinder C, has movement imparted thereto.

Simultaneous with the locking of the rotor 10 the rotor 11 is unlocked and as the cylinder C is fired, the rotor 11 is driven in a counterclockwise direction and thus completes the revolution of the shaft 7 which was started by the rotor 10. The head 40 of the rotor 10 being closed, the ratchet mechanism at this end of the engine remains inactive while the ratchet mechanism at the opposite end of the engine is imparting the final half revolution to the shaft 7, and eventually the cylinder B is placed in condition for firing, then the cylinder D, and the cycle of operation repeated, beginning with cylinder A, and so on. Thus what takes place in the various cylinders and the relative positions of the abutments have been brought out in Figs. 12 to 15 inclusive, and to recapitulate in order that the broad aspect of my invention may be understood, I desire to direct attention to the following characteristics or structural features best noted in Fig. 1.

First, there is an engine casing or block with a rotary set of cylinders (rotors) therein acting as sleeve valves, the alternating operation or timing of which is controlled by the driving of the cylinders *per se*, and a locking mechanism that insures proper registration of ports which must exhaust or admit gases or fuel to and from the cylinders.

Second, the follower abutment in each cylinder is operated by connection with another cylinder, and conversely each cylinder operates a follower abutment in another cylinder.

Third, a plurality of rotary cylinders having relatively disposed power abutments turning as a unit, and they in turn operate a follower in each of a plurality of other rotatable cylinders which in a like manner, turn as a unit.

Fourth, assuming that the engine is used as a power plant of an automobile or similar vehicle with the engine shaft connected to the rear axle, either direct or through the medium of a reduction gearing, then, without any interposed clutch, it is possible for the rear axle or a shaft journaled therein, to revolve at a greater speed than the engine shaft, or said shaft to idle in one direction of rotation in the engine.

Fifth, my invention is not necessarily limited to ratchet mechanism for transmitting power from alternately power producing means, as the power transmitting means may be actuated from the peripheries of the rotors and located outside of the engine or block.

What I claim is:—

1. An internal combustion engine, comprising a casing, rotors therein adapted to receive an explosive mixture and discharge burned gases, power abutments in said rotors, follower abutments in said rotors, the power abutments of one rotor being movable in unison with the follower abutments of another rotor, and the power abutments of the last mentioned rotor being movable with the follower abutments of the first mentioned rotor, and ignition means for said engine.

2. An internal combustion engine as characterized in claim 1, and wherein, the power abutments are in sets diametrically opposed, and the follower members in sets diametrically opposed.

3. An internal combustion engine comprising a casing having ports, rotors in said casing serving as valves for the ports of said casing, means in said rotors affected by an explosion therein to cause said rotors to revolve, and means adapted for holding one rotor stationary during the rotation of the other rotor.

4. An engine as characterized in claim 3, and wherein a shaft is concentric of said rotors, and means employed for transmitting power from said rotors, to said shaft.

5. An engine as characterized in claim 3, and wherein the holding means is in the form of detents carried by the rotors and adapted to engage in the casing.

6. An internal combustion engine comprising a casing, abutting rotors in said casing providing a plurality of cylinders, means in each cylinder of each rotor affected by explosion therein to cause the rotor to revolve, and means adapted to cause an alternate operation of said rotors.

7. An engine as characterized in claim 6, and wherein the means controlling the operation of the rotors is at the ends of the engine and inclosed by the outer ends of the rotors.

8. An engine as characterized in claim 6, and wherein a shaft is common to the cylinders of said rotors, and means disposed at the ends of the engine for transmitting power from either rotor to said shaft.

9. An internal combustion engine comprising a casing, rotors in said casing providing cylinder walls, one rotor having a hub portion forming the inner wall of another cylinder, the other rotor having a hub portion forming the inner wall of the last mentioned cylinder, and means in the cylinders of said rotors affected by an explosion therein to cause said rotors to revolve.

10. An engine as characterized in claim 9, and wherein the rotors abut and have the outer ends thereof provided with means adapted to cause an alternate operation of said rotors.

11. An engine as characterized in claim 9 and wherein a shaft is concentric of the hub portions, and means disposed at the ends of said rotors to transmit power from said rotors to said shaft.

12. An engine as characterized in claim 9 and wherein the casing is ported for the admission of fuel and exhaust of burned gases to and from the cylinders of said rotors, and said rotors serving as sleeve valves for opening and closing the ports of said casing.

13. An internal combustion engine comprising a casing, rotors in said casing, a hub portion on each rotor, partitions in each rotor coöperating with said hub portions in providing cylinders, each hub portion being rotatable with a rotor other than the one with the partitions of which it coöperates, and means in said cylinders affected by an explosion therein adapted to cause said rotors to revolve.

14. An engine as characterized in claim 13, and wherein a shaft extends through said hub portion, and means are employed for transmitting power from said rotors to said shaft.

15. An internal combustion engine comprising a casing, rotors in said casing, a hub portion in each rotor providing a cylinder, each hub portion being rotatable with a rotor other than the one within which it is positioned, and means in said cylinders affected by an explosion therein adapted to cause said rotors to revolve.

16. An engine as characterized in claim 15, and wherein the casing is ported and the rotors serve as valves for the casing ports.

17. An internal combustion engine having a plurality of cylinders revoluble about a common axis, means in said cylinders affected by an explosion therein adapted to cause said cylinders to revolve, and means adapted for holding some of said cylinders stationary during the rotation of other cylinders.

18. An engine as characterized in claim 17, and wherein the axis of said cylinders is a shaft, and means at the ends of the engine for affording constant rotation of said shaft in one direction from the alternate operation of said rotors.

19. An internal combustion engine having cylinders end to end and composed of inner and outer walls, the inner wall of each cylinder being rotatable with a cylinder other than the one within which it is located, abutments carried by the outer walls of said cylinders, and means adapted for affecting an explosion at each abutment to move said abutments.

20. An internal combustion engine having rotary cylinders composed of inner and outer walls, the inner wall of each cylinder being rotatable with a cylinder other than the one in which it forms a part, abutments in said cylinders, and means adapted for effecting an explosion between the abutments in each cylinder so as to impart alternate movement to said cylinders.

21. An engine as characterized in claim 20, and wherein some of the abutments are carried by the outer cylinder walls and the other abutments by the inner cylinder walls, with means for positioning said abutments so that no two cylinders are rotated together.

22. An engine as characterized in claim 20 and wherein the outer walls of said cylinders serve as valves controlling the admission of fuel and exhaust of burned gases to and from said cylinders.

23. An internal combustion engine comprising two abutting rotors providing outer cylinder walls, a hub portion on each rotor providing an inner cylinder wall for the other rotor, partitions between said cylinder walls providing two cylinders for each rotor, abutments in each cylinder, means adapted to effect an explosion between the abutments of each cylinder to cause each rotor to revolve, and means adapted to control rotation of said rotors so that said abutments will be positioned relative to each other.

24. In a multi-cylinder engine, rotary cylinders arranged side by side with one part of one cylinder forming a rotative part of another cylinder, abutments in said cylinders, one carried by the cylinder in which it is located and another by the part of said cylinder which is rotatable with another cylinder, and means for introducing charges between said abutments to cause said cylinders to revolve.

25. An engine as characterized in claim 24, and wherein a shaft is axially and common to all cylinders, and means for causing said cylinders to alternately impart movement to said shaft.

26. An engine as characterized in claim 24, and wherein some of the abutments are carried by the outer walls of the cylinders and the remaining abutments carried by the inner walls of said cylinders, with the outer walls of said cylinders serving as valves to control the admission and exhaust of fuel and burned gases to and from said cylinders.

27. An internal combustion engine comprising a ported casing, a shaft concentric thereof, ported rotors supported upon said shaft, and serving as valves relative to the ports of said casing, partitions in said rotors providing a pair of cylinders in each rotor, abutments in each cylinder and between which an explosion is effected to impart movement to said rotors, means adapted to automatically engage in said casing to alternately lock said rotors against rotation, and a ratchet mechanism between said shaft and said rotors so that said rotors may alternately impart motion to said shaft.

28. An engine as characterized in claim 27 and wherein liners are mounted in the cylinders for supporting the abutments therein and in a defined relation.

29. An internal combustion engine comprising a casing, plates closing the ends of said casing, a shaft journaled in said plates, abutting rotors in said casing, heads carried by the outer ends of said rotors, hub portions in said rotors, partitions in said rotors on said hub portions and providing cylinders in each rotor, abutments in each cylinder of each rotor, means for introducing and firing explosive charges between the abutments of each cylinder to cause said rotors to revolve, means between the heads of said rotors and the hub portions thereof adapted for locking either rotor relative to said casing, and means between said heads and said end plates for transmitting power of either rotor to said shaft.

30. An internal combustion engine having rotary cylinders composed of inner and outer walls, the inner wall of each cylinder being supported from a cylinder other than the one in which it is located, abutments in said cylinders, means adapted for effecting an explosion between the abutments of the cylinders so as to impart an alternate movement to said cylinders, and means engaging said cylinders and operatable through the medium of a single shaft for imparting movement to either cylinder for starting purposes.

31. An internal combustion engine comprising a casing having ports, rotors in said casing, serving as valves for the ports of said casing, means in said rotors affected by an explosion therein to cause said rotors to revolve, means adapted for holding one rotor stationary during the rotation of the other rotor, and means engaging both rotors adapted for imparting movement to either rotor for starting purposes.

32. An internal combustion engine comprising a casing, rotors in said casing, a shaft concentric of said rotors, means for introducing and firing an explosive charge in each rotor to cause said rotors to revolve, means for transmitting power from each of said rotors to said shaft, said rotors and said means being arranged so that the rotors alternately operate to impart rotation to the shaft, and means engaging each rotor for starting purposes.

33. In a multi-cylinder engine, rotary cylinders arranged side by side and in pairs, a shaft axially of said cylinders, means for transmitting power from said cylinders to said shaft arranged to permit the shaft to idle in one direction of rotation independent of said cylinders, and means for alternately locking the pairs of cylinders.

34. An internal combustion engine comprising a shaft, rotors adapted to alternately operate said shaft, means adapted to cause said rotors to revolve, a starter shaft common to said rotors, and means actuated by said starter shaft adapted for imparting movement to either rotor.

35. An internal combustion engine having sets of cylinders, power abutments in one set of cylinders connected to turn as a unit, follower abutments in another set of cylinders actuated by said power abutments to turn as a unit, and means adapted for effecting an explosion between the abutments of each cylinder to impart movement thereto.

In testimony whereof I affix my signature in the presence of two witnesses.

TYRRELL H. DUNCOMBE.

Witnesses:
LEWIS E. FLANDERS,
G. E. McGRANN.